United States Patent
Kim et al.

(10) Patent No.: US 11,976,015 B2
(45) Date of Patent: May 7, 2024

(54) NANOENERGETIC MATERIAL COMPOSITE-BASED SOLID PROPELLANT, METHOD OF PREPARING THE SAME, AND PROJECTILE USING THE SAME

(71) Applicant: PUSAN NATIONAL UNIVERSITY INDUSTRY-UNIVERSITY COOPERATION FOUNDATION, Busan (KR)

(72) Inventors: Soohyung Kim, Busan (KR); Jihoon Kim, Busan (KR); Kyungju Kim, Busan (KR); Myunghoon Cho, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 1222 days.

(21) Appl. No.: 16/468,613

(22) PCT Filed: Jul. 7, 2017

(86) PCT No.: PCT/KR2017/007301
§ 371 (c)(1),
(2) Date: Jun. 11, 2019

(87) PCT Pub. No.: WO2018/117359
PCT Pub. Date: Jun. 28, 2018

(65) Prior Publication Data
US 2019/0300453 A1 Oct. 3, 2019

(30) Foreign Application Priority Data

Dec. 23, 2016 (KR) .......................... 10-2016-0178428

(51) Int. Cl.
*C06B 21/00* (2006.01)
*C06B 25/02* (2006.01)
(Continued)

(52) U.S. Cl.
CPC ...... *C06B 21/0083* (2013.01); *C06B 21/0008* (2013.01); *C06B 25/02* (2013.01);
(Continued)

(58) Field of Classification Search
None
See application file for complete search history.

(56) References Cited

FOREIGN PATENT DOCUMENTS

DE    102007003412    *    8/2008
KR    10-2009-0018735 A    2/2009
(Continued)

OTHER PUBLICATIONS

Estes product catalog, 2010, p. 43 (Year: 2010).*
(Continued)

*Primary Examiner* — Aileen B Felton
(74) *Attorney, Agent, or Firm* — Paratus Law Group, PLLC (57) ABSTRACT

Disclosed are a nanoenergetic material composite-based solid propellant, a method of preparing the same, and a projectile using the same. The propellant includes: potassium nitrate-sucrose (KNSU) composite powder; and nanoenergetic material (nEM) composite powder in a solid powder form mixed with the KNSU composite powder to prepare a KNSU/nEM propellant. The method includes: preparing KNSU composite powder; preparing nEM composite powder; and preparing a KNSU/nEM propellant by mixing the KNSU composite powder and the nEM composite powder in a solid powder form. The projectile includes: a clay block; a clay nozzle responsible for releasing the pressure generated by explosion of a propellant; and a propellant lamination area disposed between the clay block and the clay nozzle. Upon ignition of the KNSU/nEM
(Continued)

propellant, the nEM composite powder increases the combustion rate and combustion temperature of a potassium nitrate-sucrose (KNSU) propellant.

10 Claims, 10 Drawing Sheets (51) Int. Cl.
  C06B 31/02 (2006.01)
  C06B 33/00 (2006.01)
  F02K 9/08 (2006.01)
(52) U.S. Cl.
  CPC ............. *C06B 31/02* (2013.01); *C06B 33/00* (2013.01); *F02K 9/08* (2013.01)

(56) References Cited

FOREIGN PATENT DOCUMENTS

| KR | 10-2015-0116346 A | 10/2015 |
| KR | 10-2016-0105186 A | 9/2016 |

OTHER PUBLICATIONS

International Search Report for PCT/KR2017/007301 mailed Oct. 18, 2017 from Korean Intellectual Property Office.

Kim, Ji Hoon, Performance Improvements of Solid Rocket Propellant Using Energetic Materials and their Applications into Small Model Rocket, 2016 International Military Science and Technology Fair Conference Presentation, Aug. 5, 2016, pp. 12, 212-213, Seoul, KR.

Estes Product Catalog (URL: http://www.estesrockets.com/media//catalogs/Estes_2015_Catalog.pdf), 2015, pp. 1-95.

Kyung Ju Kim et al., Effect of aluminum micro- and nanoparticles on ignition and combustion properties of energetic composites for interfacial bonding of metallic substrates, Combustion and Flame, Nov. 2018, pp. 319-327, vol. 197.

Sang Beom Kim et al., Micro- and Nanoscale Energetic Materials as Effective Heat Energy Sources for Enhanced Gas Generators, ACS Applied Materials & Interfaces, Mar. 23, 2016, pp. 9405-9412, vol. 8, No. 14.

* cited by examiner

NANOENERGETIC MATERIAL COMPOSITE-BASED SOLID PROPELLANT, METHOD OF PREPARING THE SAME, AND PROJECTILE USING THE SAME

CROSS-REFERENCE TO PRIOR APPLICATIONS

This application is a National Stage Patent Application of PCT International Patent Application No. PCT/KR2017/007301 (filed on Jul. 7, 2017) under 35 U.S.C. § 371, which claims priority to Korean Patent Application No. 10-2016-0178428 (filed on Dec. 23, 2016), which are all hereby incorporated by reference in their entirety.

BACKGROUND

The present disclosure relates to preparation of a solid propellant. More particularly, the present disclosure relates to a nanoenergetic material composite-based solid propellant (KNSU/nEM composite propellant) having excellent performance and prepared by mixing a potassium nitrate-sucrose (KNSU) propellant and nanoenergetic materials (nEMs), a method of preparing the nanoenergetic material composite-based solid propellant, and a projectile using the nanoenergetic material composite-based solid propellant.

Nowadays, metal fuels are mainly used as solid propellants.

A solid propellant is a solid block prepared by mixing an oxidizer and a fuel in a powder form with a binder in a relatively uniform manner, and is formed mainly in the form of a cylinder and used in a rocket propulsion engine.

In this case, metal powder is added to the fuel as an additive to increase thrust and reduce unstable combustion.

At present, metal powder is used only as an additive and is not used as a major fuel, and is known to be inefficient. The limitations of metal powder are due to poor ignition/combustion characteristics and material properties thereof.

In general, solid propellants are widely used as second propellants for military missiles or space launch vehicles because of simple structures thereof and easy maintenance/repair.

To improve the performance of solid propellants, a high combustion rate thereof and effective release of high temperature and high pressure generated during combustion are required. Development of manufacturing techniques for future solid propellants capable of meeting these requirements is required.

SUMMARY

Therefore, the present disclosure has been made in view of the above problems, and it is an object of the present disclosure to provide a nanoenergetic material composite-based solid propellant, a method of preparing the same, and a projectile using the same. According to the present disclosure, a KNSU/nEM composite propellant having excellent performance may be prepared by mixing a potassium nitrate-sucrose (KNSU) composite propellant and nanoenergetic materials (nEMs).

It is another object of the present disclosure to provide a nanoenergetic material composite-based solid propellant, a method of preparing the same, and a projectile using the same. According to the present disclosure, a solid propellant having excellent performance including a high combustion rate and excellent heat and pressure emission characteristics may be prepared based on nanoenergetic materials (nEMs).

It is still another object of the present disclosure to provide a nanoenergetic material composite-based solid propellant, a method of preparing the same, and a projectile using the same. According to the present disclosure, a solid propellant prepared based on nanoenergetic materials (nEMs) may be applied to a small projectile. In this case, the propulsion characteristics of the propellant may be analyzed by analyzing the ceiling, the combustion rate of the propellant, and propulsion time to improve the propulsion performance of the small projectile.

It is yet another object of the present disclosure to provide a nanoenergetic material composite-based solid propellant, a method of preparing the same, and a projectile using the same. According to the present disclosure, in a KNSU/nEM composite-based solid propellant, since combustion of the nanoenergetic materials (nEMs) proceeds at high speed and high temperature, the combustion rate and combustion temperature of the KNSU propellant may be increased, and complete combustion of the KNSU propellant may be induced.

It is yet another object of the present disclosure to provide a nanoenergetic material composite-based solid propellant, a method of preparing the same, and a projectile using the same. According to the present disclosure, reliable simulation prediction results of a small projectile may be obtained by calculating the flight altitude, speed, acceleration, mass change, and the like using a MATLAB program based on the results of measurement of thrust when propelling the small projectile as a pre-launch simulation of the small projectile.

It is yet another object of the present disclosure to provide a nanoenergetic material composite-based solid propellant, a method of preparing the same, and a projectile using the same. According to the present disclosure, the content of nEMs included in a KNSU propellant with critical significance may be determined by securing the measured thrust data of a small projectile according to change in the content of nEMs included in the KNSU propellant.

It is yet another object of the present disclosure to provide a nanoenergetic material composite-based solid propellant, a method of preparing the same, and a projectile using the same. According to the present disclosure, to prepare KNSU/nEM ($KNO_3/C_{12}H_{22}O_{11}/Al/CuO$) composite powder, sucrose ($C_{12}H_{22}O_{11}$) microparticles having an average diameter of approximately 10 μm and potassium nitrate ($KNO_3$) microparticles having an average diameter of approximately 2 μm may be used as components of a potassium nitrate-sucrose (KNSU) propellant, and a KNSU composite and nEM powder may be physically mixed in a solid powder state.

It is yet another object of the present disclosure to provide a nanoenergetic material composite-based solid propellant, a method of preparing the same, and a projectile using the same. According to the present disclosure, $C_{12}H_{22}O_{11}/KNO_3/Al/CuO$ particles may be uniformly distributed and mixed by attaching nanoscale Al and CuO particles to the surfaces of relatively large microscale $C_{12}H_{22}O_{11}$ and $KNO_3$ particles to improve the performance of a solid propellant.

The present disclosure is not limited to the above-mentioned objects, and other objects not mentioned can be clearly understood by those skilled in the art from the following description.

In accordance with the present disclosure, the above and other objects can be accomplished by providing a nanoenergetic material composite-based solid propellant including potassium nitrate-sucrose (KNSU) composite powder; and nanoenergetic material (nEM) composite powder in a solid powder form mixed with the potassium nitrate-sucrose (KNSU) composite powder to prepare a KNSU/nEM propellant, wherein upon ignition of the KNSU/nEM propellant, the nanoenergetic material (nEM) composite powder increases the combustion rate and combustion temperature of a potassium nitrate-sucrose (KNSU) propellant.

Here, the potassium nitrate-sucrose (KNSU) composite powder may be prepared by physically mixing sucrose ($C_{12}H_{22}O_{11}$) and potassium nitrate ($KNO_3$) in a mass ratio of 35 to 65 ($C_{12}H_{22}O_{11}$:$KNO_3$=35:65).

In addition, the nanoenergetic material (nEM) composite powder may be prepared by mixing Al nanoparticles (Al NPs) as a fuel material and CuO nanoparticles (CuO NPs) as an oxidizing material in a mass ratio of 30 to 70 (Al NPs:CuO NPs=30:70).

In addition, the KNSU/nEM propellant may be $KNO_3$/$C_{12}H_{22}O_{11}$/Al/CuO composite powder.

In addition, 1 to 5 wt % of the nanoenergetic material (nEM) composite powder may be contained in the KNSU/nEM propellant.

In accordance with an aspect of the present disclosure, the above and other objects can be accomplished by providing a method of preparing a nanoenergetic material composite-based solid propellant including a step of preparing potassium nitrate-sucrose (KNSU) composite powder; a step of preparing nanoenergetic material (nEM) composite powder; and a step of preparing a KNSU/nEM propellant by mixing the potassium nitrate-sucrose (KNSU) composite powder and the nanoenergetic material (nEM) composite powder in a solid powder form, wherein upon ignition of the KNSU/nEM propellant, the nanoenergetic material (nEM) composite powder increases the combustion rate and combustion temperature of a potassium nitrate-sucrose (KNSU) propellant.

Here, in the step of preparing potassium nitrate-sucrose (KNSU) composite powder, sucrose ($C_{12}H_{22}O_{11}$) and potassium nitrate ($KNO_3$) may be ground, dried, and physically mixed in a mass ratio of 35 to 65 ($C_{12}H_{22}O_{11}$:$KNO_3$=35:65).

In addition, in the step of preparing nanoenergetic material (nEM) composite powder, Al nanoparticles (Al NPs) as a fuel material and CuO nanoparticles (CuO NPs) as an oxidizing material may be mixed in a mass ratio of 30 to 70 (Al NPs:CuO NPs=30:70).

In addition, in the step of preparing a KNSU/nEM propellant, $KNO_3$/$C_{12}H_{22}O_{11}$/Al/CuO composite powder may be prepared.

In addition, in the step of preparing a KNSU/nEM propellant, the nanoenergetic material (nEM) composite powder may be contained in an amount of 1 to 5 wt %.

In accordance with another aspect of the present disclosure, there is provided a projectile using a nanoenergetic material composite-based solid propellant including a clay block disposed at an upper portion thereof; a clay nozzle disposed at a lower portion thereof and responsible for releasing the pressure generated by explosion of a propellant; and a propellant lamination area disposed between the clay block and the clay nozzle, wherein a KNSU/nEM propellant prepared by mixing potassium nitrate-sucrose (KNSU) composite powder and nanoenergetic material (nEM) composite powder is laminated in the propellant lamination area, and upon ignition of the KNSU/nEM propellant, the nanoenergetic material (nEM) composite powder increases the combustion rate and combustion temperature of a potassium nitrate-sucrose (KNSU) propellant.

Here, a potassium nitrate-sucrose (KNSU) propellant not mixed with the nanoenergetic material (nEM) composite powder and a KNSU/nEM propellant containing the nanoenergetic material (nEM) composite powder may be alternately laminated in the propellant lamination area.

In addition, as a result of alternately laminating the potassium nitrate-sucrose (KNSU) propellant not mixed with the nanoenergetic material (nEM) composite powder and the KNSU/nEM propellant containing the nanoenergetic material (nEM) composite powder, a thrust inflection point may be generated in a section where the type of a propellant is changed.

In addition, the propulsion characteristics of the propellants, such as combustion rate, combustion time, maximum thrust, and average thrust, may be controlled by changing the lamination number and lamination order of the propellant materials.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Hereinafter, preferred embodiments for a nanoenergetic material composite-based solid propellant, a method of preparing the same, and a projectile using the same according to the present disclosure will be described in detail as follows.

The features and advantages of a nanoenergetic material composite-based solid propellant, a method of preparing the same, and a projectile using the same according to the present disclosure will be explained in detail through embodiments described below.

Figure 1:
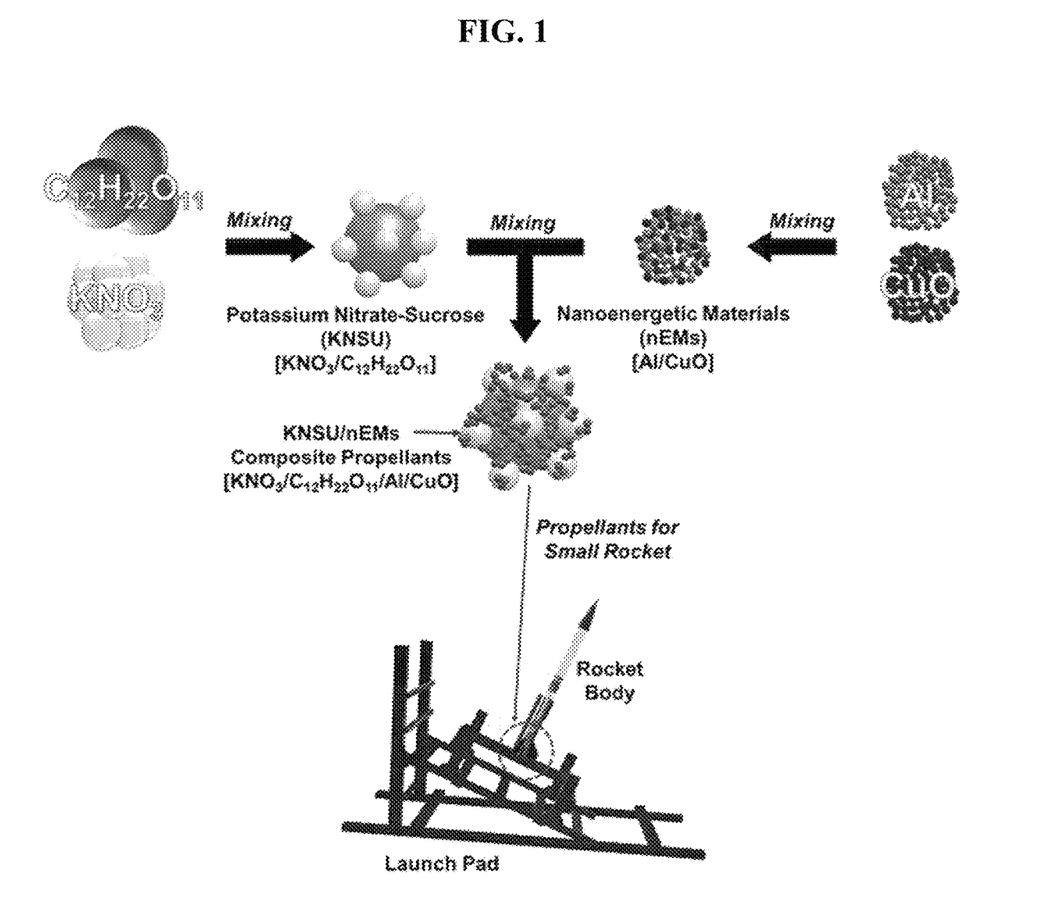
FIG. 1 illustrates preparation of a nanoenergetic material composite-based solid propellant according to the present disclosure and application thereof to a solid propellant for small projectiles.

FIG. 1 illustrates preparation of a nanoenergetic material composite-based solid propellant according to the present disclosure and application thereof to a solid propellant for small projectiles.

In the KNSU/nEM composite-based solid propellant of the present disclosure, nanoenergetic materials (nEMs) may be combusted at high speed and high temperature, whereby the combustion rate and combustion temperature of a KNSU propellant may be increased, and complete combustion of the KNSU propellant may be induced.

To improve the performance of a solid propellant, rapid combustion of the propellant and efficient release of high temperature and pressure generated during combustion are required. Nanoenergetic materials (nEMs) are solid propellants that can meet these requirements.

According to the present disclosure, a novel solid propellant having improved thrust characteristics as compared to conventional solid propellants was developed by applying nanoenergetic materials to preparation of a solid propellant.

Specifically, a potassium nitrate-sucrose (KNSU) composite propellant known as a solid propellant was mixed with aluminum nanopowder and copper oxide nanopowder as nanoenergetic materials (nEMs) in a specific ratio to prepare a KNSU/nEM composite-based solid propellant (KNSU/nEM composite propellant). The prepared KNSU/nEM composite-based solid propellant was compared with a conventional KNSU propellant through a small projectile propulsion test to determine whether the thrust of the KNSU/nEM composite-based solid propellant was improved.

In addition, to perform a thrust test, a motor for projectiles using the KNSU/nEM composite-based solid propellant was manufactured and installed in a small projectile. Through a thrust test, the ceiling of the small projectile, the combustion rate and propulsion time of the propellant, and the like were analyzed. Based on the obtained results, the propulsion characteristics of the propellant were analyzed. As a result, it was confirmed that the propulsion performance of the KNSU/nEM composite-based solid propellant (KNSU/nEM composite propellant) was improved.

In the present disclosure, to prepare a potassium nitrate-sucrose (KNSU)/nanoenergetic material (nEM) composite-based solid propellant, sucrose ($C_{12}H_{22}O_{11}$) microparticles having an average diameter of approximately 10 μm and potassium nitrate ($KNO_3$) microparticles having an average diameter of approximately 2 μm were used as the components of the potassium nitrate-sucrose (KNSU) propellant.

In addition, aluminum (Al) nanoparticles having an average diameter of approximately 100 nm as a fuel metal and copper oxide (CuO) nanoparticles having an average diameter of approximately 100 nm as an oxidizing material were used as the components of the nanoenergetic materials (nEMs).

FIG. 1 illustrates a preparation process for potassium nitrate-sucrose (KNSU;$KNO_3$/$C_{12}H_{22}O_{11}$)/nanoenergetic material (nEM:Al/CuO) composite powder and a solid propellant for small projectiles to which the composite powder is applied.

The nanoenergetic material composite-based solid propellant (KNSU/nEM propellant) according to the present disclosure is prepared by mixing KNSU composite powder prepared by physically mixing sucrose ($C_{12}H_{22}O_{11}$) and potassium nitrate ($KNO_3$) in a mass ratio of 35 to 65 ($C_{12}H_{22}O_{11}$:$KNO_3$=35:65) and nanoenergetic material (nEM) composite powder in a solid powder form prepared by mixing aluminum (Al) nanoparticles as a fuel material and copper oxide (CuO) nanoparticles as an oxidizing material.

The nanoenergetic material (nEM) composite powder is preferably prepared by mixing Al nanoparticles (Al NPs) and CuO nanoparticles (CuO NPs) in a mass ratio of 30 to 70 (Al NPs:CuO NPs=30:70), without being limited thereto.

In addition, the KNSU/nEM propellant is $KNO_3$/$C_{12}H_{22}O_{11}$/Al/CuO composite powder.

Preferably, 1 to 5 wt % of the nanoenergetic material (nEM) composite powder is contained in the KNSU/nEM propellant, without being limited thereto.

In the KNSU/nEM composite-based solid propellant according to the present disclosure, the nanoenergetic materials (nEMs) are combusted at high speed and high temperature, whereby the combustion rate and combustion temperature of the KNSU propellant are increased and complete combustion of the KNSU propellant is induced.

The preparation process of the nanoenergetic material composite-based solid propellant according to the present disclosure will be described in detail as follows.

Figure 2:
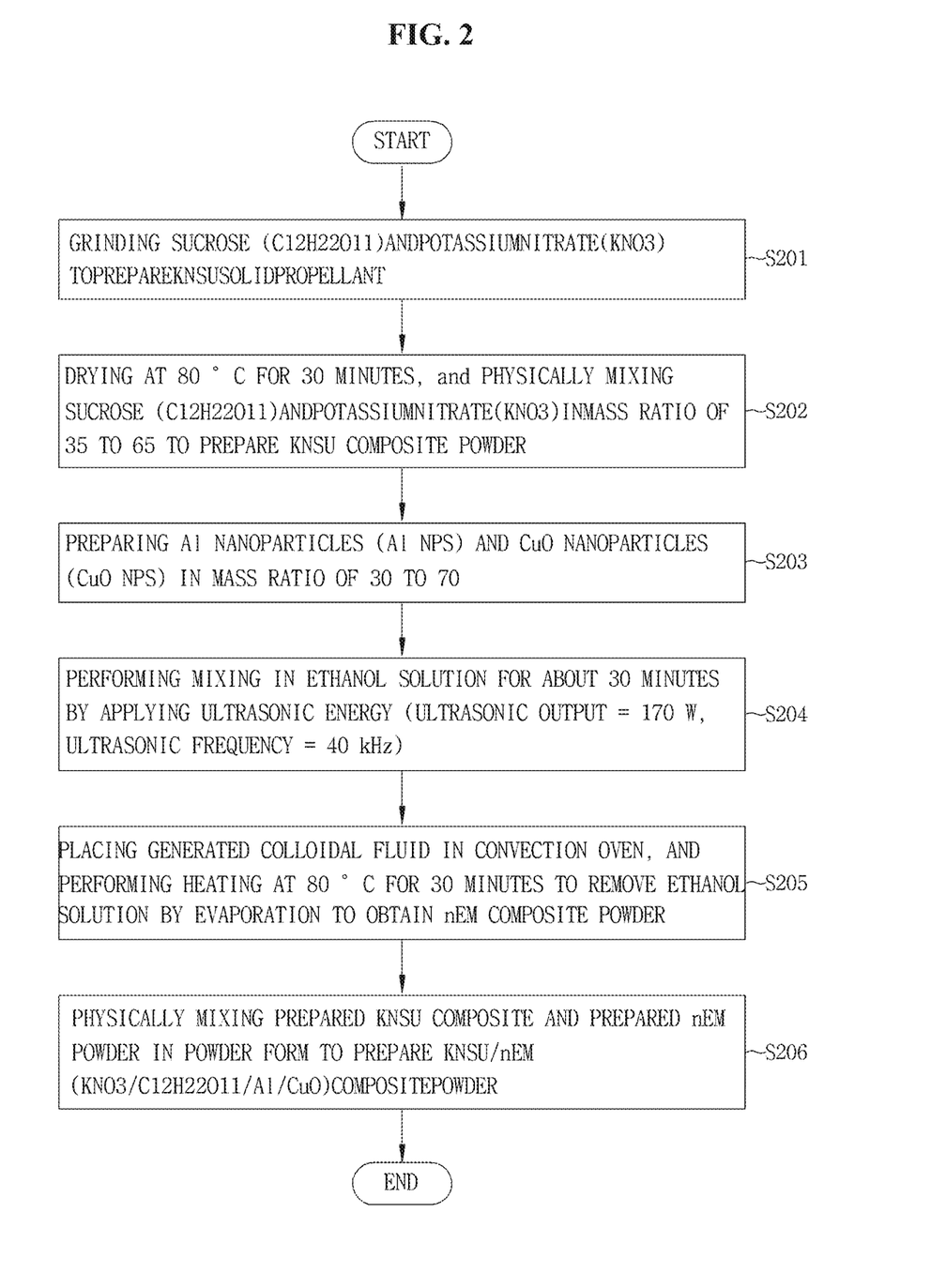
FIG. 2 is a flowchart showing a method of preparing a nanoenergetic material composite-based solid propellant according to the present disclosure.

FIG. 2 is a flowchart showing a method of preparing a nanoenergetic material composite-based solid propellant according to the present disclosure.

First, to prepare a conventional KNSU solid propellant, sucrose ($C_{12}H_{22}O_{11}$) and potassium nitrate ($KNO_3$) were ground (S201), dried at 80° C. for 30 minutes, and physically mixed in a mass ratio of 35 to 65 ($C_{12}H_{22}O_{11}$:$KNO_3$=35:65) to prepare KNSU composite powder (S202).

In addition, to prepare the nanoenergetic materials (nEMs), Al nanoparticles (Al NPs) and CuO nanoparticles (CuO NPs) were prepared in a mass ratio of 30 to 70 (Al NPs:CuO NPs=30:70) (S203).

Then, the Al NPs and the CuO NPs were mixed in an ethanol solution for about 30 minutes by applying ultrasonic energy (ultrasonic output=170 W, ultrasonic frequency=40 kHz) to the Al NPs and the CuO NPs (S204). The generated colloidal fluid was placed in a convection oven and heated at 80° C. for 30 minutes to remove the ethanol solution by evaporation to obtain nEM composite powder (S205).

Finally, the prepared KNSU composite and nEM powder were physically mixed in a solid powder form to prepare KNSU/nEM (i.e., $KNO_3$/$C_{12}H_{22}O_{11}$/Al/CuO) composite powder (S206). Scanning electron microscope (SEM) images of the prepared KNSU and KNSU/nEM composite powders are shown in FIG. 3 and FIG. 4.

Figure 3:
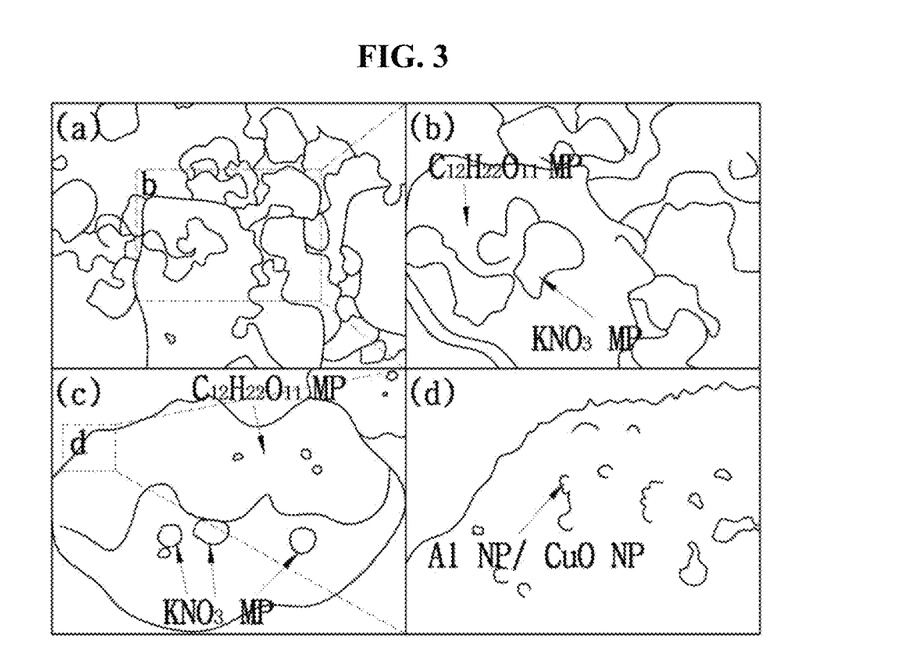
FIGS. 3 and 4 illustrate composition, and scanning electronic microscope images, of (a)(b) Potassium Nitrate-Sucrose (KNSU, $KNO_3$/$C_{12}H_{22}O_{11}$) composite powder and (c)(d) KNSU/nEM composite powder, respectively.
Figure 4:
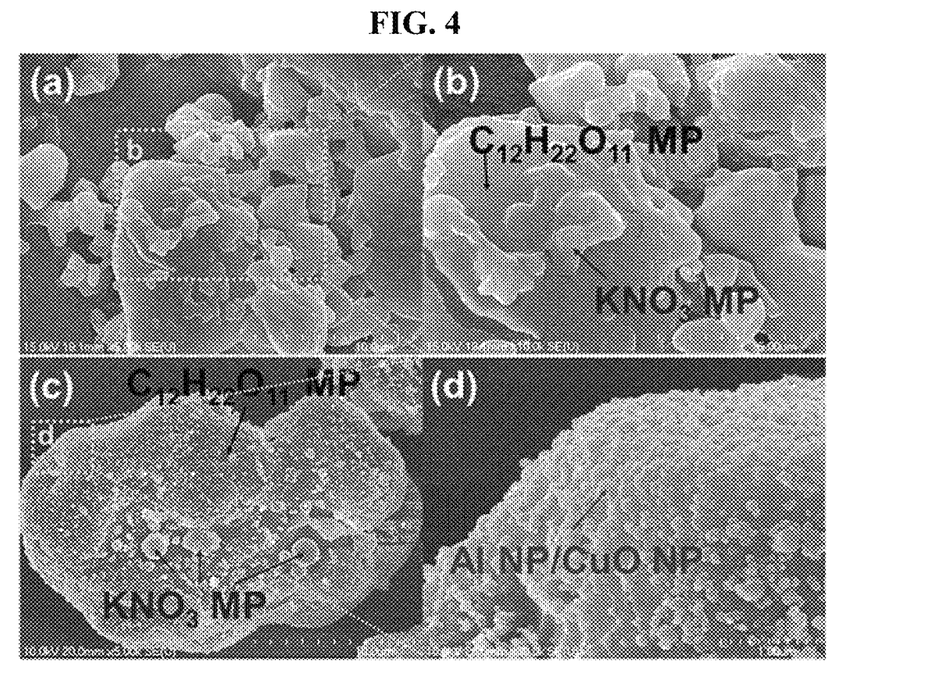

The real photographic images of the KNSU and KNSU/nEM composite powers illustrated in FIG. 3 are shown in FIG. 4.

(a)(b) of FIG. 4 are scanning electron microscope images of the potassium nitrate-sucrose (KNSU, $KNO_3$/$C_{12}H_{22}O_{11}$) composite powder, and (c)(d) of FIG. 4 are scanning electron microscope images of the KNSU/nEM composite powder.

In FIG. 3 and FIG. 4, MP represents a microparticle, and NP represents a nanoparticle.

As shown in (a)(b) of FIG. 4, it can be seen that microscale primary particles of $C_{12}H_{22}O_{11}$ and $KNO_3$, which are the components of the KNSU propellant, are relatively uniformly mixed.

In addition, as shown in (c)(d) of FIG. 4, it can be clearly confirmed that nanoscale Al and CuO particles are attached to the surfaces of relatively large microscale $C_{12}H_{22}O_{11}$ and KNO$_3$ particles and thus C$_{12}$H$_{22}$O$_{11}$/KNO$_3$/Al/CuO particles are uniformly dispersed and mixed.

The propulsion performance of the nanoenergetic material composite-based solid propellant according to the present disclosure was analyzed as follows.

Figure 5:
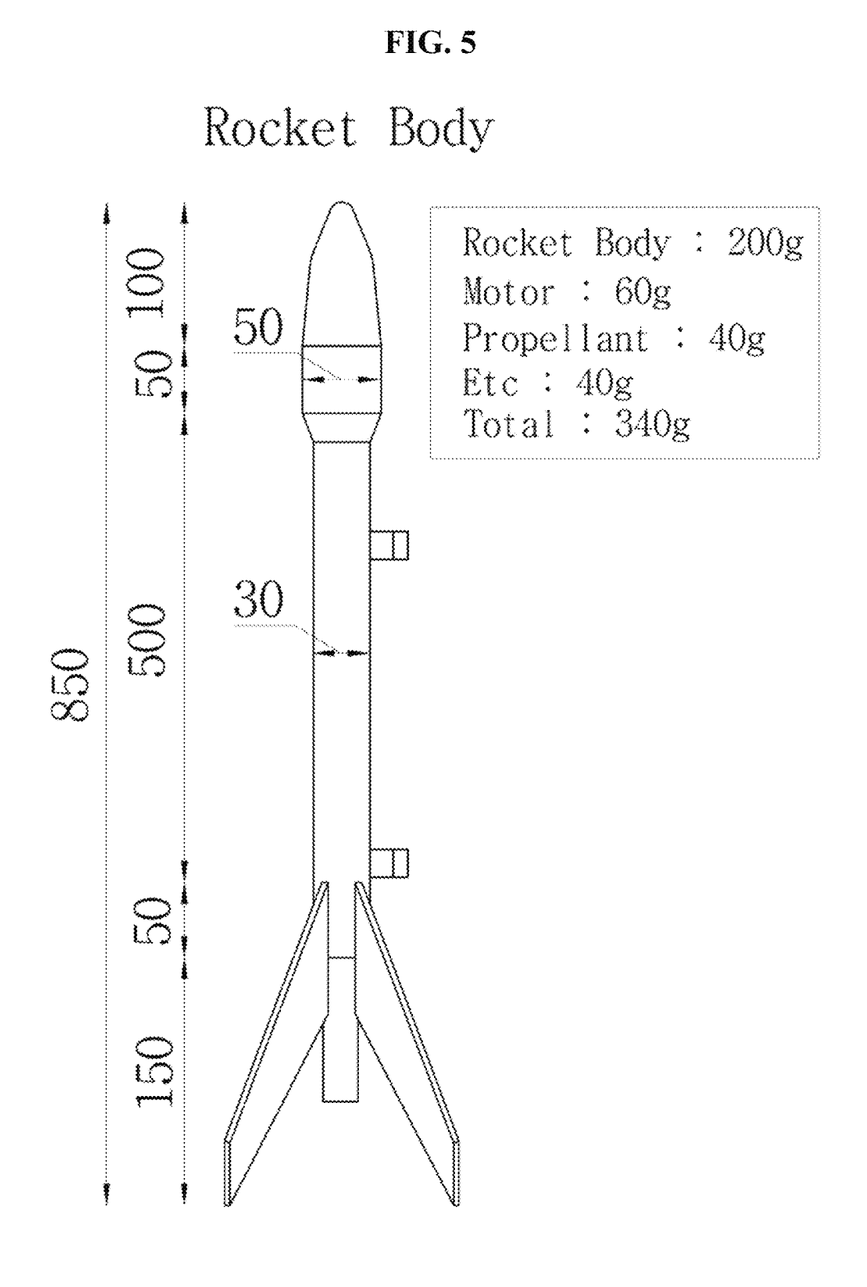
FIG. 5 illustrates the structure of a small projectile.
Figure 6:
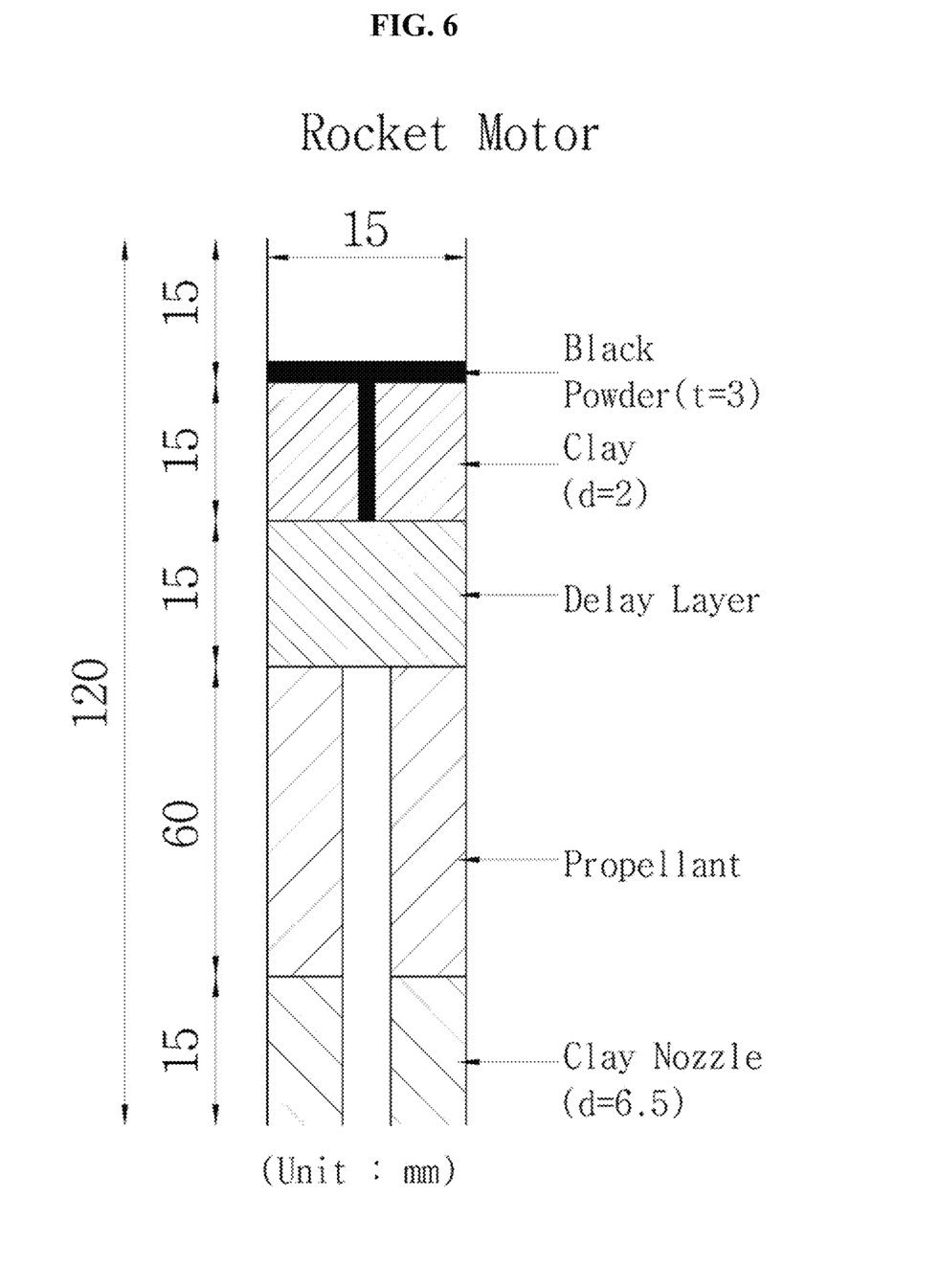
FIG. 6 illustrates the internal structure of a motor for projectiles.

To evaluate the propulsion performance of the KNSU/nEM composite-based solid propellant according to the present disclosure upon ignition, as shown in FIGS. 4 to 6, an apparatus for thrust measurement, a small projectile, and a motor for projectiles were designed and manufactured, and then thrust measurement and a small projectile propulsion test were performed.

In the case of the thrust measurement test, a projectile motor was fixed to an apparatus for thrust measurement, and then when the solid propellant was ignited through a fuse, the generated thrust was measured through a load cell installed in the apparatus for thrust measurement.

The small projectile was mainly made of a light plastic material, and a parachute was provided in the upper portion of the projectile and a motor for projectiles was installed at the lower end of the projectile.

The motor for projectiles was made using a PVC pipe. In the PVC pipe, a propellant for generating thrust, a delay layer for controlling the release timing of a parachute, and a black powder for generating pressure required for the release of the parachute were charged. In addition, a clay nozzle was used to eject pressure generated by explosion of the propellant.

Propellant performance and field propulsion test results for the small projectile are as follows.

Figure 7:
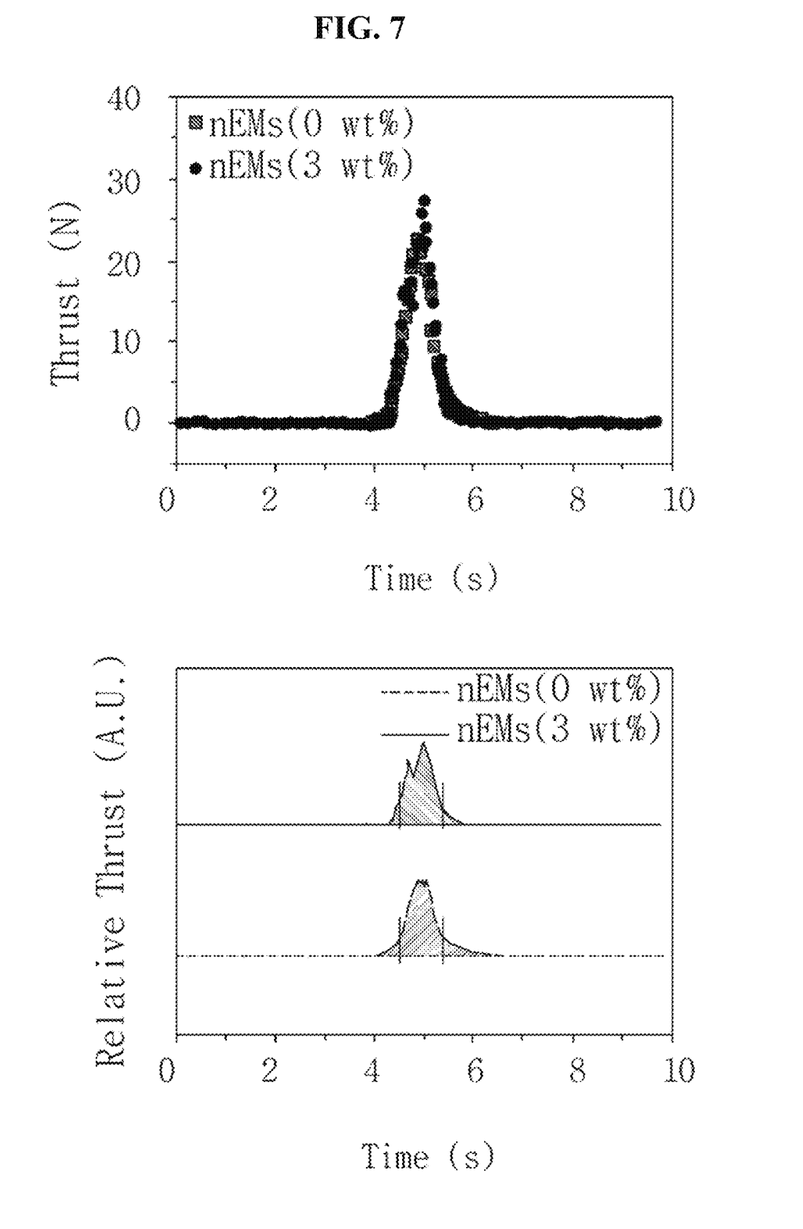
FIG. 7 includes a graph showing the results of measuring the thrust of KNSU/nEM (0 & 3 wt %) composite-based solid propellants and a graph showing the results of comparing the total impulses ($I_{total}$) of the KNSU/nEM (0 & 3 wt %) composite-based solid propellants.

The results of the thrust measurement test for evaluating the performance of the KNSU/nEM composite-based solid propellant are shown in FIG. 7.

The thrust of a motor for projectiles filled with 40 g of each KNSU/nEM (0 & 3 wt %)-based solid propellant was measured.

It can be seen that, upon ignition, the flame is brighter and larger in the case of the KNSU/nEM (3 wt %) composite propellant than in the case of the KNSU/nEM (0 wt %) composite propellant, and explosive gas is also strongly ejected in the case of the KNSU/nEM (3 wt %) composite propellant.

As shown in the graph showing thrust measurement results measured by the load cell installed in the thrust measurement system of FIG. 7, it can be confirmed that the maximum thrust (~30 N) of the KNSU/nEM (3 wt %) composite propellant is higher than that (~25 N) of the KNSU/nEM (0 wt %) composite propellant, showing an approximate 20% increase.

In the total impulse ($I_{total}$) comparison graph of FIG. 7, total impulse ($I_{total}$), which is an integral value of the generated thrust with respect to time, is shown.

In the case of total impulse, it can be confirmed that the total impulse (16.3 Ns) of the KNSU/nEM (3 wt %) composite propellant is higher than that (14.4 Ns) of the KNSU/nEM (0 wt %) propellant, showing an approximate 13% increase. In addition, it can be confirmed that the total impulse (total impulse in an area that generates thrust greater than the weight of a projectile) that can be used for propulsion of an actual projectile is increased from 13.3 Ns to 15.7 Ns, showing an approximate 18% increase.

These results indicate that the nanoenergetic materials (nEMs) in the KNSU/nEM composite-based solid propellant are combusted at high speed and high temperature, leading to a rise in the combustion rate and combustion temperature of the KNSU propellant and complete combustion of the KNSU propellant.

Figure 8:
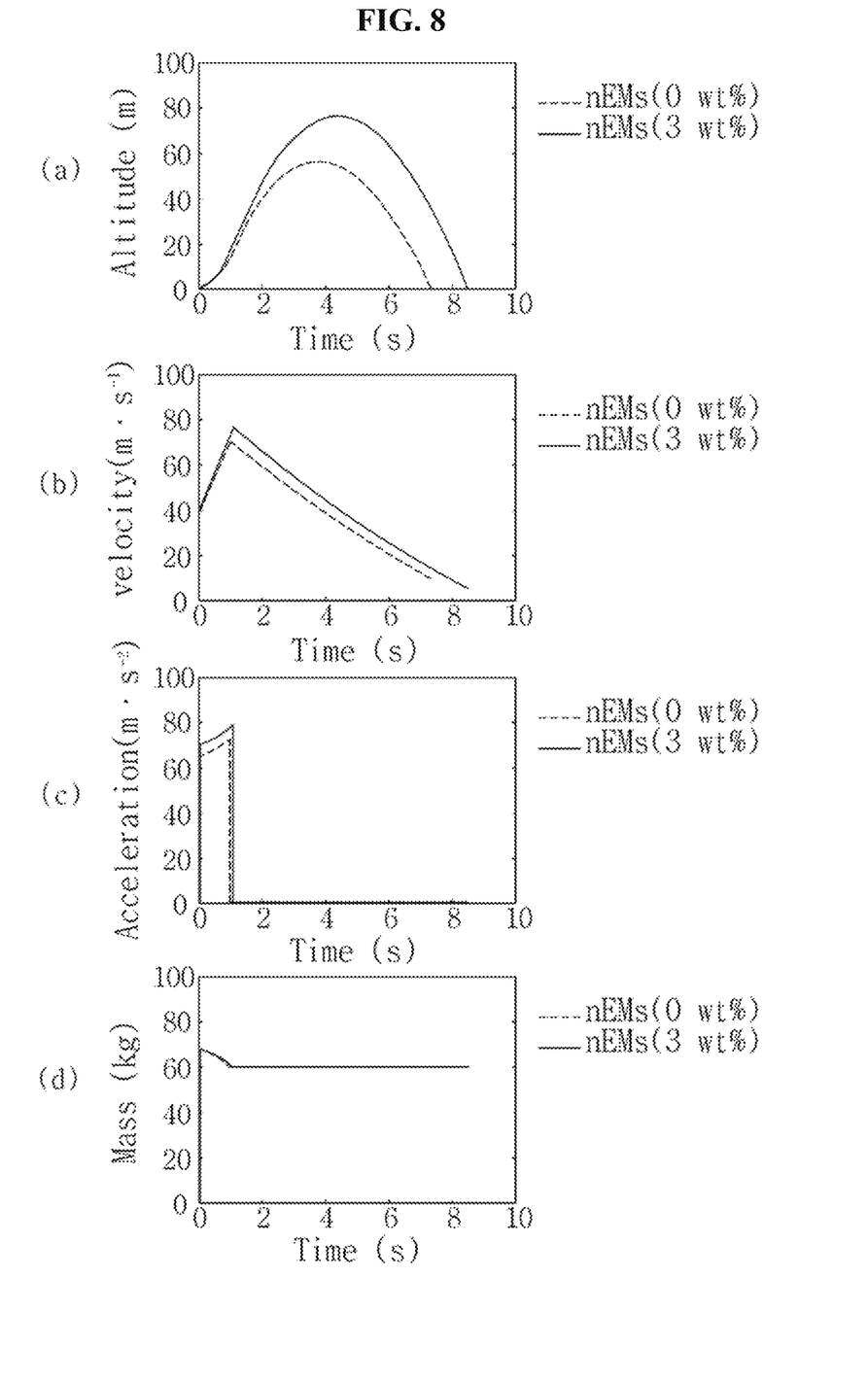
FIG. 8 includes graphs showing the results of comparing simulations for flight altitude (a), speed (b), acceleration (c), and mass change simulation (d) when a small projectile equipped with a projectile motor charged with each KNSU/nEM (0 & 3 wt %) composite-based solid propellant is propelled.

Based on the thrust measurement results of FIG. 7, as a pre-launch simulation of a small projectile, flight altitude, speed, acceleration, and mass change upon launching the small projectile were calculated using a MATLAB program, and the results are shown in FIG. 8.

FIG. 8 includes graphs showing the results of comparing simulations for flight altitude (A), speed (B), acceleration (C), and mass change simulation (D) when a small projectile equipped with a projectile motor charged with each KNSU/nEM (0 & 3 wt %) composite-based solid propellant is propelled.

It can be confirmed that, compared to the case when the nEMs are not included in the KNSU propellant (i.e., 0 wt % nEMs), when 3 wt % of the nEMs is contained in the KNSU propellant, propulsion altitude, speed, and acceleration over time are significantly improved.

Figure 9:
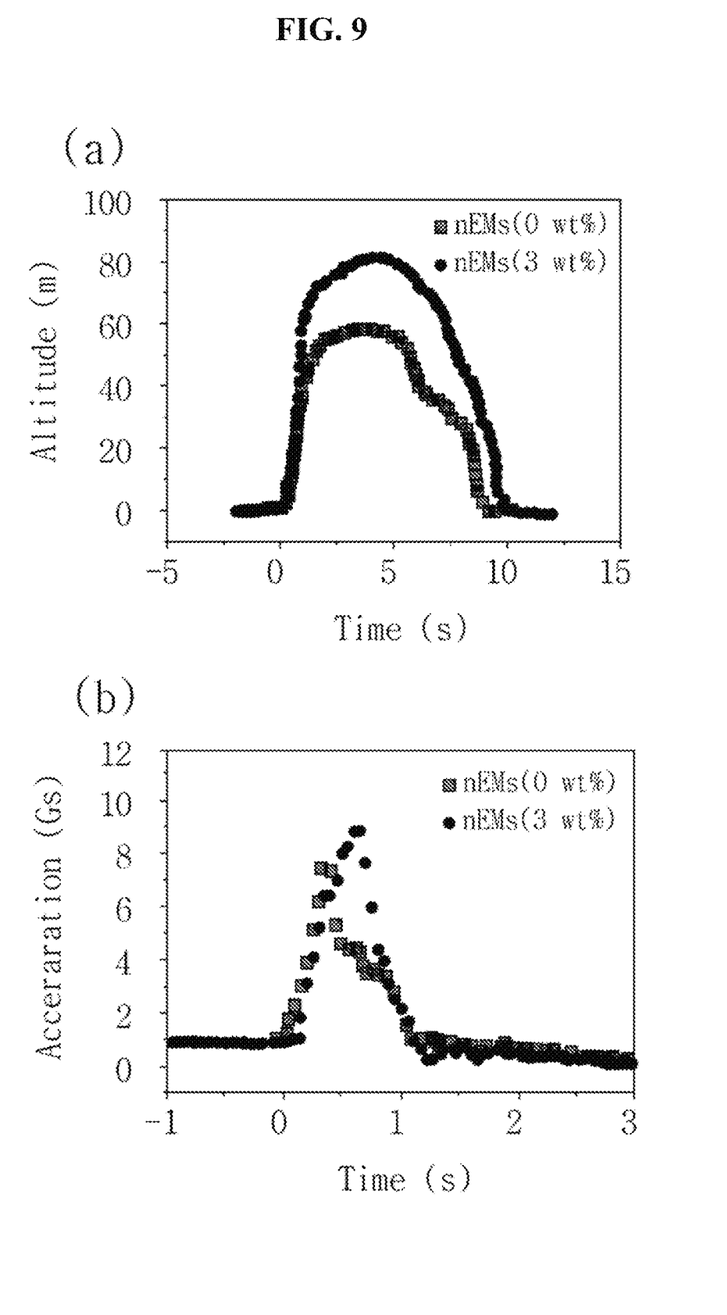
FIG. 9 includes graphs showing a flight altitude record (a) and acceleration (b) measured by an altitude-acceleration sensor mounted in a small projectile charged with each KNSU/nEM (0 & 3 wt %) composite-based solid propellant.

In addition, the measurement results of the acceleration of a small projectile provided with each KNSU/nEM (0 & 3 wt %) composite-based solid propellant in field testing are shown in FIG. 9.

FIG. 9 includes graphs showing a flight altitude record (A) and acceleration (B) measured by an altitude-acceleration sensor mounted in a small projectile charged with each KNSU/nEM (0 & 3 wt %) composite-based solid propellant.

It was confirmed that, after ignition of the projectile motor, the small projectile was successfully propelled with strong exhaust gas ejection, and about 4 seconds after launch, the small projectile reached the maximum altitude point, a parachute was ejected, and the small projectile stably dropped.

(a)(b) of FIG. 9 show altitude and acceleration results measured using an altitude-acceleration sensor (Altimeter 3, Jolly Logic, USA) mounted in the small projectile.

In the case of the KNSU/nEM (3 wt %) composite-based solid propellant, the highest flight altitude was about 81.4 m, showing a higher value than the highest flight altitude (59.1 m) of the KNSU/nEM (0 wt %) solid propellant. That is, compared to the KNSU/nEM (0 wt %) solid propellant, in the case of the KNSU/nEM (3 wt %) solid propellant, the highest flight altitude was increased approximately 38%. In addition, the KNSU/nEM (3 wt %) solid propellant and the KNSU/nEM (0 wt %) solid propellant respectively exhibited maximum accelerations of 8.8 gs and 7.4 gs, showing an approximate 19% increase in the case of the KNSU/nEM (3 wt %) solid propellant compared to the KNSU/nEM (0 wt %) solid propellant.

In addition, these results are similar to the simulation results shown in FIG. 8, indicating that reliable simulation prediction results of a small projectile may be obtained based on the measured thrust data of a small projectile.

The structure of a projectile using the nanoenergetic material composite-based solid propellant according to the present disclosure will be described in detail as follows.

Figure 10:
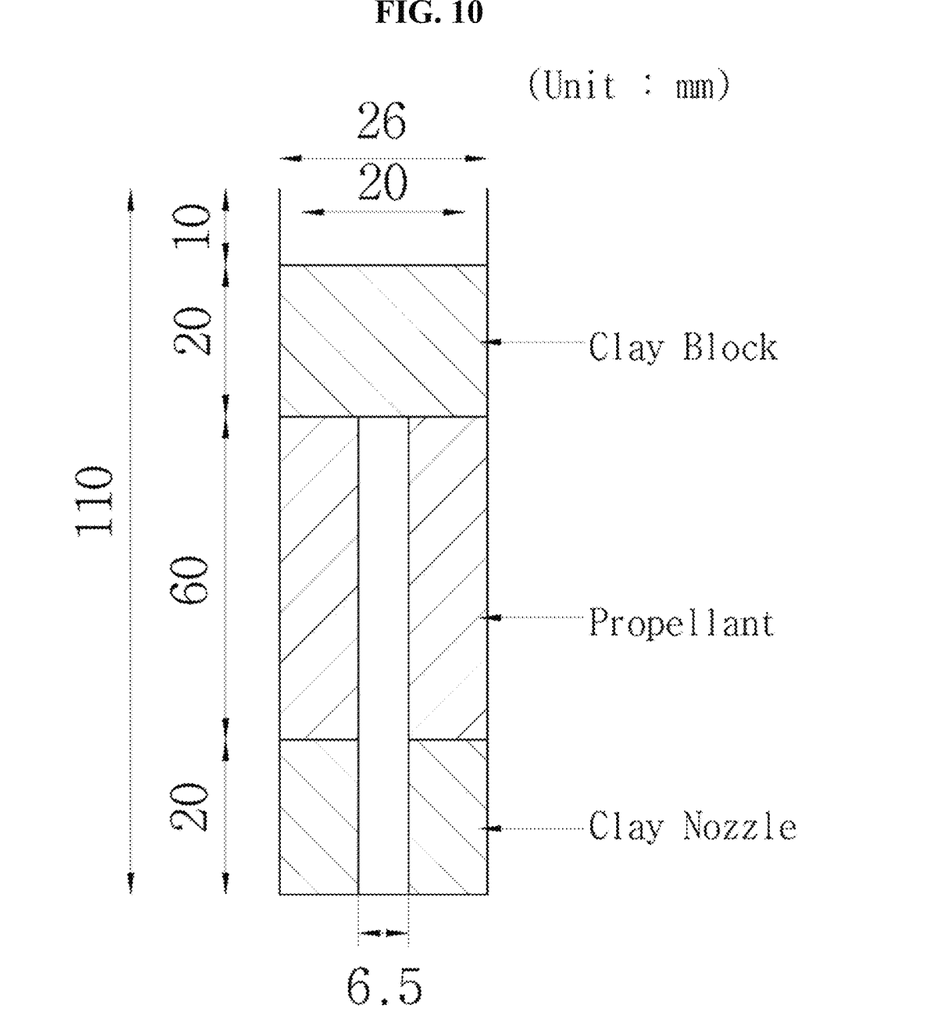
FIG. 10 illustrates the configuration of a projectile using the nanoenergetic material composite-based solid propellant according to the present disclosure.
Figure 11:
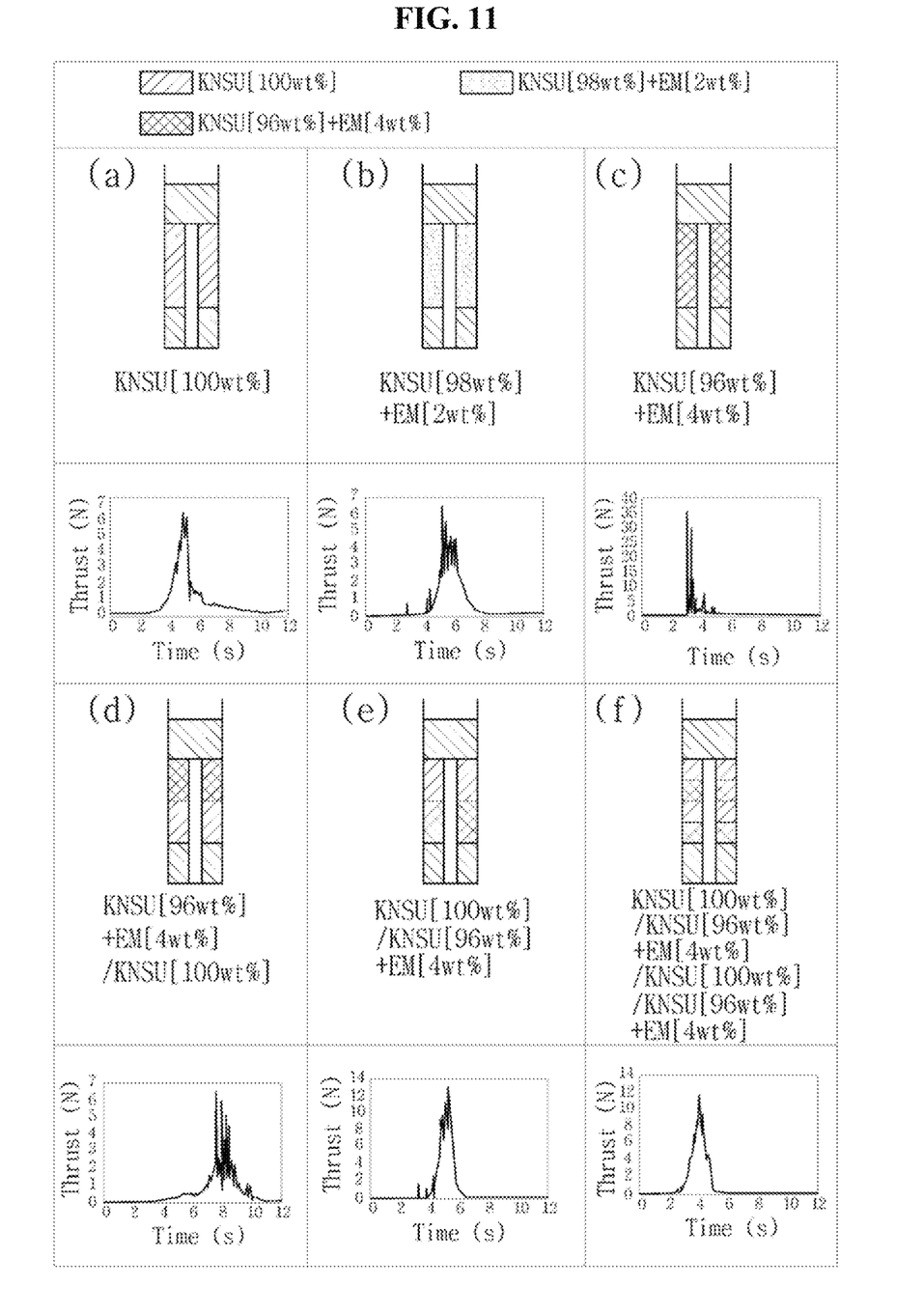
FIG. 11 shows a laminated structure of a solid propellant in a projectile using the nanoenergetic material composite-based solid propellant according to the present disclosure and includes graphs showing thrust characteristics.

FIG. 10 illustrates the configuration of a projectile using the nanoenergetic material composite-based solid propellant according to the present disclosure, and FIG. 11 shows a laminated structure of a solid propellant in a projectile using the nanoenergetic material composite-based solid propellant according to the present disclosure and includes graphs showing thrust characteristics.

As shown in FIG. 10, the projectile using the nanoenergetic material composite-based solid propellant according to the present disclosure includes a clay block disposed in an upper portion thereof, a clay nozzle disposed in a lower portion thereof and responsible for releasing the pressure generated by explosion of a propellant, and a propellant lamination area between the clay block and the clay nozzle.

The thrust characteristics of the projectile having such a configuration depending on the lamination structure of a solid propellant will be described as follows.

(a) of FIG. 11 shows a projectile using a potassium nitrate-sucrose (KNSU) (100 wt %) propellant and not including the nanoenergetic material (nEM) composite powder in the propellant lamination area. From the results of thrust measurement, it can be confirmed that the maximum thrust is relatively low and the thrust generation time is relatively long.

(b) of FIG. 11 shows a projectile using a propellant containing KNSU (98 wt %) and nEMs (2 wt %). It can be confirmed that the maximum thrust is similar to that of FIG. 11A, and upon ignition, the combustion rate is increased due to the nEMs (2 wt %), leading to shortening of the thrust generation time as compared with (a) of FIG. 11.

(c) of FIG. 11 shows a projectile using a propellant containing KNSU (96 wt %) and nEMs (4 wt %). It can be seen that, due to the increased content of the nEMs (4 wt %), the combustion rate is sharply increased upon ignition, the maximum thrust is increased to about 5 times that of (a) and (b) of FIG. 11, and the thrust generation time is shortened.

(d) of FIG. 11 shows a projectile in which a propellant containing KNSU (96 wt %) and nEMs (4 wt %) is charged into an upper portion where a clay block is present and a propellant containing KNSU (100 wt %) is charged into a lower portion where a clay nozzle is present, i.e., a propellant containing KNSU (96 wt %) and nEMs (4 wt %) and a propellant containing KNSU (100 wt %) are laminated. In this case, two stages of thrust sections are generated.

It can be confirmed that, in the first stage (4 to 6 seconds) in which the propellant containing KNSU (100 wt %) is combusted, a relatively low thrust occurs, and in the second stage (6 to 10 seconds) in which the propellant containing KNSU (96 wt %) and nEMs (4 wt %) is combusted, a high thrust occurs.

In addition, (e) of FIG. 11 shows a projectile in which a propellant containing KNSU (100 wt %) is charged into an upper portion where a clay block is present and a propellant containing KNSU (96 wt %) and nEMs (4 wt %) is charged into a lower portion where a clay nozzle is present, i.e., a propellant containing KNSU (100 wt %) and a propellant containing KNSU (96 wt %) and nEMs (4 wt %) are laminated. In this case, two stages of thrust sections are generated.

It can be confirmed that in the first stage (3 to 5 seconds) in which the propellant containing KNSU (96 wt %) and nEMs (4 wt %) is combusted, a very high thrust occurs, and in the second stage (5 to 8 seconds) in which the propellant containing KNSU (100 wt %) is combusted, a somewhat high thrust occurs.

In addition, (f) of FIG. 11 shows a projectile in which a propellant containing KNSU (100 wt %), a propellant containing KNSU (96 wt %) and nEMs (4 wt %), a propellant containing KNSU (100 wt %), and a propellant containing KNSU (96 wt %) and nEMs (4 wt %) are sequentially laminated from an upper portion where a clay block is present. In this case, several thrust inflection points occur in the layers where the type of the propellant changes.

These results indicate that the propulsion characteristics of propellants, such as combustion rate, combustion time, maximum thrust, and average thrust, may be controlled depending on the lamination number and lamination order of propellant materials.

When propellants are laminated, the content of the nanoenergetic material (nEM) composite powder does not have to be constant, and the content of the nanoenergetic material (nEM) composite powder may be changed depending on the purpose of a projectile.

As described above, according to the present disclosure, a KNSU/nEM composite-based solid propellant was prepared by mixing a conventional potassium nitrate-sucrose (KNSU) solid propellant and nanoenergetic materials (nEMs) including Al nanoparticles and CuO nanoparticles, and a small projectile equipped with a projectile motor charged with the KNSU/nEM composite-based solid propellant was designed and manufactured. Then, through ignition and launch tests performed in a field, it was confirmed that the thrust of the KNSU/nEM composite-based solid propellant was improved.

Therefore, according to the present disclosure, a novel KNSU/nEM composite solid propellant having improved thrust may be obtained by applying nEMs to a solid propellant. That is, a high performance solid propellant containing nanoenergetic materials may be prepared.

The nanoenergetic material composite-based solid propellant, the method of preparing the same, and the projectile using the same according to the present disclosure have the following effects.

First, a solid propellant (KNSU/nEM composite propellant) having improved performance can be prepared by mixing a potassium nitrate-sucrose (KNSU) composite propellant and nanoenergetic materials (nEMs).

Second, a solid propellant having improved performance including a high combustion rate and excellent heat and pressure emission characteristics can be prepared based on nanoenergetic materials (nEMs).

Third, a solid propellant prepared based on nanoenergetic materials (nEMs) can be applied to a small projectile. In this case, the propulsion characteristics of the propellant can be analyzed by analyzing the ceiling, the combustion rate of the propellant, and propulsion time to improve the propulsion performance of the small projectile.

Fourth, in a KNSU/nEM composite-based solid propellant, since combustion of the nanoenergetic materials (nEMs) proceeds at high speed and high temperature, the combustion rate and combustion temperature of the KNSU propellant can be increased, and complete combustion of the KNSU propellant can be induced.

Fifth, reliable simulation prediction results of a small projectile can be obtained by calculating flight altitude, speed, acceleration, mass change, and the like using a MATLAB program based on the results of measurement of thrust when propelling the small projectile as a pre-launch simulation of the small projectile.

Sixth, the content of nEMs included in a KNSU propellant with critical significance can be determined by securing the measured thrust data of a small projectile according to change in the content of nEMs included in the KNSU propellant.

It will be understood by those skilled in the art that various changes may be made in the present disclosure without departing from the spirit and scope of the disclosure as defined by the appended claims.

In addition, the preferred embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The present disclosure relates to preparation of a solid propellant. Specifically, the present disclosure relates to a nanoenergetic material composite-based solid propellant (KNSU/nEM composite propellant) having excellent performance and prepared by mixing a potassium nitrate-sucrose (KNSU) propellant and nanoenergetic materials (nEMs), a method of preparing the nanoenergetic material composite-based solid propellant, and a projectile using the nanoenergetic material composite-based solid propellant.

What is claimed is:

1. A projectile using a nanoenergetic material composite-based solid propellant, comprising:
    a clay block disposed at an upper portion thereof;
    a clay nozzle disposed at a lower portion thereof and responsible for releasing the pressure generated by explosion of a propellant; and
    a propellant lamination area disposed between the clay block and the clay nozzle,
    wherein a KNSU/nEM propellant prepared by mixing potassium nitrate-sucrose (KNSU) composite powder and nanoenergetic material (nEM) composite powder is laminated in the propellant lamination area, and
    upon ignition of the KNSU/nEM propellant, the nanoenergetic material (nEM) composite powder increases the combustion rate and combustion temperature of a potassium nitrate-sucrose (KNSU) propellant,
    wherein the KNSU composite powder is a microscale composite powder and the nEM composite powder has an average diameter of 100 nm.

2. The projectile according to claim 1, wherein a potassium nitrate-sucrose (KNSU) propellant not mixed with the nanoenergetic material (nEM) composite powder and a KNSU/nEM propellant containing the nanoenergetic material (nEM) composite powder are alternately laminated in the propellant lamination area.

3. The projectile according to claim 2, wherein as a result of alternately laminating the potassium nitrate-sucrose (KNSU) propellant not mixed with the nanoenergetic material (nEM) composite powder and the KNSU/nEM propellant containing the nanoenergetic material (nEM) composite powder, a thrust inflection point is generated in a section where a type of a propellant is changed.

4. The projectile according to claim 2, wherein propulsion characteristics of the propellants, such as combustion rate, combustion time, maximum thrust, and average thrust, are controlled by changing the lamination number and lamination order of the propellant materials.

5. The projectile according to claim 1, wherein the nanoenergetic material (nEM) composite powder comprises aluminum nanopowder.

6. The projectile according to claim 1, wherein the nanoenergetic material (nEM) composite powder comprises copper oxide.

7. The projectile according to claim 2, wherein the nanoenergetic material (nEM) composite powder comprises aluminum nanopowder.

8. The projectile according to claim 2, wherein the nanoenergetic material (nEM) composite powder comprises copper oxide.

9. The projectile according to claim 1, wherein the nanoenergetic material (nEM) composite powder comprises aluminum nanopowder and copper oxide.

10. The projectile according to claim 2, wherein the nanoenergetic material (nEM) composite powder comprises aluminum nanopowder.

* * * * *